US011865936B2

(12) United States Patent
Hagenmaier, Jr. et al.

(10) Patent No.: US 11,865,936 B2
(45) Date of Patent: Jan. 9, 2024

(54) SECURE ENCLOSURE FOR A DIRECT CURRENT ELECTRIC VEHICLE SUPPLY EQUIPMENT

(71) Applicant: ChargePoint, Inc., Campbell, CA (US)

(72) Inventors: Carl F. Hagenmaier, Jr., Los Altos, CA (US); Joseph Buczek, San Jose, CA (US); Ananthapadmanabhan Madhusudan, Delhi (IN); Stephen Eric Sidle, Morgan Hill, CA (US)

(73) Assignee: ChargePoint, Inc., Campbell, CA (US)

( * ) Notice: Subject to any disclaimer, the term of this patent is extended or adjusted under 35 U.S.C. 154(b) by 0 days.

(21) Appl. No.: 18/055,309

(22) Filed: Nov. 14, 2022

(65) Prior Publication Data
US 2023/0076142 A1 Mar. 9, 2023

Related U.S. Application Data (63) Continuation of application No. PCT/IB2021/054175, filed on May 14, 2021.
(Continued)

(51) Int. Cl.
 B60L 53/31 (2019.01)
 B60L 53/68 (2019.01)
(Continued)

(52) U.S. Cl.
 CPC ............... B60L 53/31 (2019.02); B60L 53/62 (2019.02); B60L 53/665 (2019.02); B60L 53/68 (2019.02);
(Continued)

(58) Field of Classification Search
 CPC ...................................................... B60L 53/31
(Continued)

(56) References Cited

U.S. PATENT DOCUMENTS

| 2011/0145141 | A1* | 6/2011 | Blain | B60L 53/65 |
| | | | | 235/382 |
| 2011/0172839 | A1* | 7/2011 | Brown | B60L 53/305 |
| | | | | 700/286 |

(Continued)

FOREIGN PATENT DOCUMENTS

| DE | 102010046174 A1 | 2/2012 |
| DE | 102011113354 A1 | 3/2013 |

(Continued)

OTHER PUBLICATIONS

Search Report and Written Opinion for International Application No. PCT/IB2021/054175, dated Dec. 3, 2021, 22 pages.
(Continued)

Primary Examiner — Jerry D Robbins
(74) Attorney, Agent, or Firm — NICHOLSON DE VOS WEBSTER & ELLIOTT LLP (57) ABSTRACT

A direct current (DC) electric vehicle supply equipment (EVSE) that includes a secure enclosure. The secure enclosure encloses a set of one or more contactors to open and close to provide DC charge transfer with one or more electric vehicles; a conductor to electrically connect the contactors with DC input; a current sensor to measure current draw; a voltage sensing circuitry to measure voltage; and one or more circuits that receive current data from the current sensor and voltage data from the voltage sensing circuitry, the one or more circuits to perform one or more safety functions and one or more metering functions using the received current data and voltage data. The DC EVSE may also include, external to the secure enclosure, a controller that is coupled with the circuits to control the opening and closing of the set of contactors.

20 Claims, 8 Drawing Sheets

Related U.S. Application Data (60) Provisional application No. 63/025,611, filed on May 15, 2020.

(51) Int. Cl.
*B60L 53/62* (2019.01)
*B60L 53/66* (2019.01)
*G06F 21/57* (2013.01)
*G06F 21/86* (2013.01)

(52) U.S. Cl.
CPC ............ *G06F 21/575* (2013.01); *G06F 21/86* (2013.01); *B60L 2210/30* (2013.01); *B60L 2270/34* (2013.01); *B60L 2270/38* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 2011/0208953 | A1* | 8/2011 | Solomon | B60L 53/65 713/400 |
| 2012/0206100 | A1* | 8/2012 | Brown | B60L 53/18 320/109 |
| 2012/0265459 | A1* | 10/2012 | Sfaelos | B60L 53/65 702/61 |
| 2013/0020993 | A1* | 1/2013 | Taddeo | B60L 53/65 320/109 |
| 2013/0036311 | A1* | 2/2013 | Akyol | H04L 63/08 713/189 |
| 2013/0190968 | A1* | 7/2013 | Nitzberg | B60L 3/0069 701/31.9 |
| 2013/0257146 | A1* | 10/2013 | Nojima | B60L 53/22 307/9.1 |
| 2013/0322017 | A1* | 12/2013 | Muller | B60L 53/16 361/690 |
| 2018/0114653 | A1* | 4/2018 | Amirthasamy | H01H 9/161 |
| 2018/0126860 | A1* | 5/2018 | Weicker | B60L 53/305 |
| 2020/0175614 | A1* | 6/2020 | Fox | B60L 53/14 |
| 2022/0203853 | A1* | 6/2022 | Dow | B60L 50/66 |

FOREIGN PATENT DOCUMENTS

| | | |
|---|---|---|
| EP | 2445746 B1 | 12/2014 |
| EP | 2755846 B1 | 4/2015 |
| EP | 2531368 B1 | 4/2019 |
| WO | 2013062453 A1 | 5/2013 |

OTHER PUBLICATIONS

Bohn, Scalable Electric Submeter Challenges for Electric Vehicle Charging; Low Level AC to DC Extreme Fast Charging for Commercial Vehicles. 2019 IEEE Transportation Electrification Conference and Expo (ITEC), IEEE Jun. 19, 2019, 6 pages.

IEC 61851-23-1 ED1: Electric Vehicle Charging Station With an Automated Connection Device, 69/632/CD, IEC, 3, Rue De Varembe, PO Box 131 CH-1211 Geneva 20, Switzerland, 2018, 86 pages.

International Preliminary Report on Patentability, PCT App. No. PCT/IB2021/054175, dated Nov. 24, 2022, 16 pages.

* cited by examiner

SECURE ENCLOSURE FOR A DIRECT CURRENT ELECTRIC VEHICLE SUPPLY EQUIPMENT

CROSS-REFERENCE TO RELATED APPLICATIONS

This application is a continuation of International Application No. PCT/IB2021/054175, filed May 14, 2021, which claims the benefit of U.S. Provisional Application No. 63/025,611, filed May 15, 2020, which are both hereby incorporated by reference.

FIELD

Embodiments of the invention relate to the field of electric vehicle supply equipment (EVSE); and more specifically, to a secure enclosure for a direct current (DC) EVSE.

BACKGROUND

Electric vehicle charging stations, sometimes referred to as EVSE, are used to charge electric vehicles (e.g., electric battery powered vehicles, gasoline/electric battery powered vehicle hybrid, etc.). An EVSE commonly includes a switchable contactor to control charge transfer for an electric vehicle. Some EVSEs also include a current measuring device to measure current flow and voltage sensing to measure voltage.

SUMMARY

A direct current (DC) electric vehicle supply equipment (EVSE) that includes a secure enclosure is described. The DC EVSE includes a set of power converters to convert alternating current (AC) mains power to direct current (DC) power. The DC EVSE includes a secure enclosure that encloses a set of one or more contactors that open and close to provide DC charge transfer with one or more electric vehicles; a conductor to electrically connect the contactors with DC input; a current sensor to measure current draw; a voltage sensing circuitry to measure voltage; and one or more circuits that receive current data from the current sensor and voltage data from the voltage sensor, the one or more circuits to perform one or more safety functions and one or more metering functions using the received current data and voltage data. The DC EVSE may also include, external to the secure enclosure, a controller that is coupled with the circuits to control the opening and closing of the set of contactors. The secure enclosure may be factory sealed. The secure enclosure may include tamper detection to detect unauthorized access.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A direct current (DC) electric vehicle supply equipment (EVSE) includes a secure enclosure that encloses a set of one or more contactors that control energy transfer to and/or from an electric vehicle, a current sensor for measuring current draw, a voltage sensor the measures voltage, and a set of one or more circuits to perform one or more metering and/or safety functions. Thus, both high precision current and voltage sensing circuitry are included within the same secure enclosure. The secure enclosure may be factory sealed. The secure enclosure may include tamper detection to detect unauthorized access. The DC EVSE also includes, external to the secure enclosure, a set of one or more power converters to convert alternating current (AC) mains power to direct current (DC) power. The DC EVSE may also include a controller, external to the secure enclosure and coupled to the secure enclosure, that includes one or more communication modules that communicate with an electric vehicle and/or one or more communication modules that communicate with an external device (e.g., a server on a network).

Figure 1:
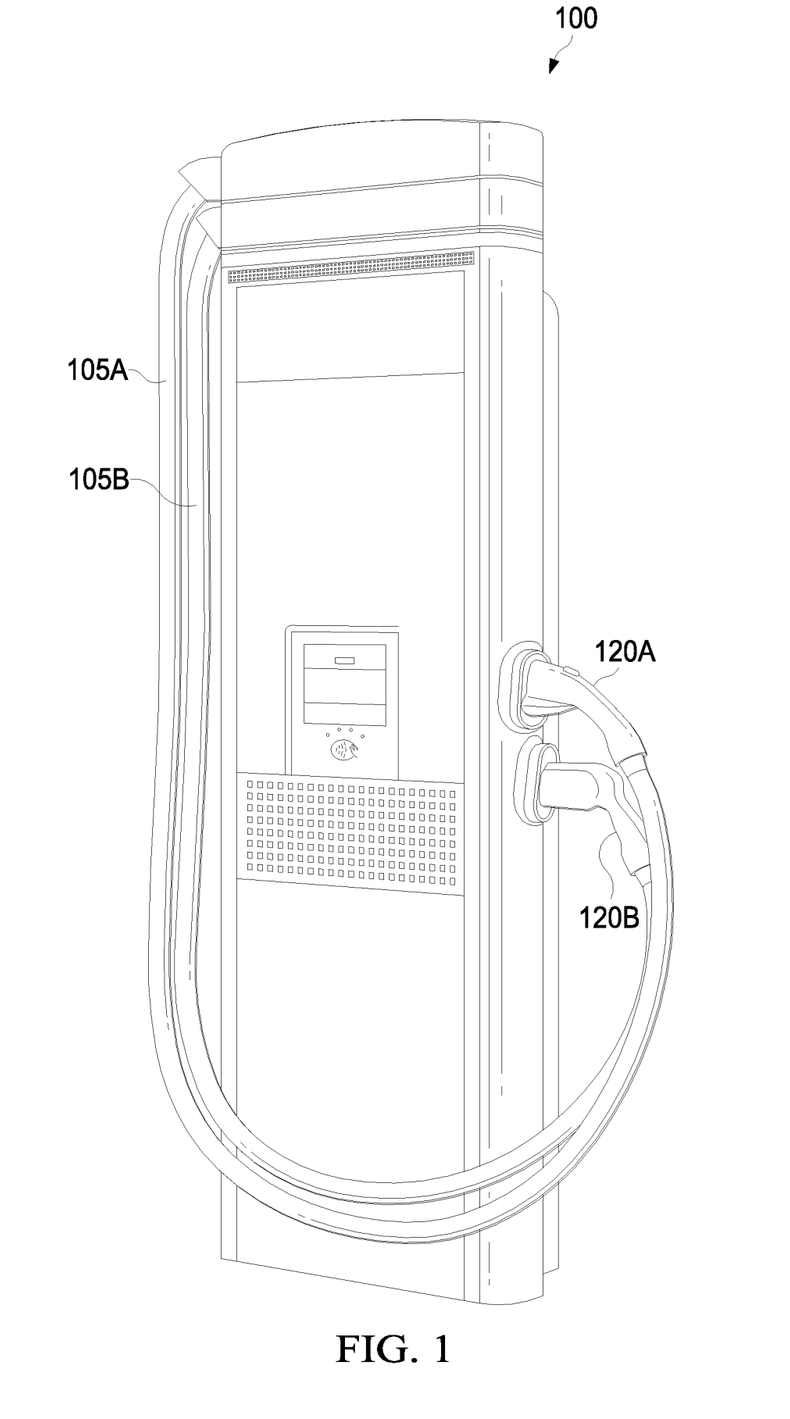
FIG. 1 shows an example DC EVSE according to an embodiment.

FIG. 1 illustrates an exemplary DC EVSE that may include a secure enclosure described herein. The EVSE 100 charges electric vehicles (e.g., electric battery powered vehicles, gasoline/electric battery powered hybrid vehicles, etc.). The DC EVSE connects to a power source (e.g., AC main supply) through a breaker to supply power for charging electric vehicles. The power source may supply, for example, 400 VAC/480 VAC, 3 phase. The EVSE 100 of FIG. 1 includes two charging cables 105A-B that include the connectors 120A-B respectively that each can be used to charge an electric vehicle. For example, an operator of an electric vehicle may connect the electric vehicle connector 120A connected with the charging cable 105A to on-board charging circuitry of their electric vehicle, or the electric vehicle connector 120B connected with the charging cable 105B, to transfer energy to the electricity storage device of the electric vehicle. The secure enclosure described herein is located internally to the EVSE 100 and is a single enclosure.

The connectors 120A and 120B may support different type of connections for electric vehicles. For instance, the connectors 120A and/or 120B may be a Combined Charging System (CCS) Type 1 connector, a CCS Type 2 connector, a CHAdeMO connector; a connector capable of connecting to Tesla Motors™ vehicles, a GB connector, and/or any other connector that attaches to an electric vehicle. The number of charging cables and connectors is exemplary, and embodiments can use one or more charging cables and one or more connectors. The EVSE 100 may, alternatively or additionally to a wired connection, support wireless charging (e.g., inductive charging and/or conductive charging).

In an embodiment, the EVSE 100 is coupled with a network. For instance, the EVSE 100 can be coupled with the network over a wide area network (WAN) link (e.g., cellular (CDMA, GRPS, etc.), WiFi Internet connection, Plain Old Telephone Service, leased line, etc.), or through a gateway (e.g., another EVSE or another device) over a LAN link (e.g., Wireless Personal Area Network (WPAN) such as Bluetooth, Zigbee, etc., Ethernet, Power Line Communication (PLC), WiFi, etc.). The network may include one or more servers that provide services for electric vehicle charging such as authorization service, accounting service, and reporting service.

Figure 2:
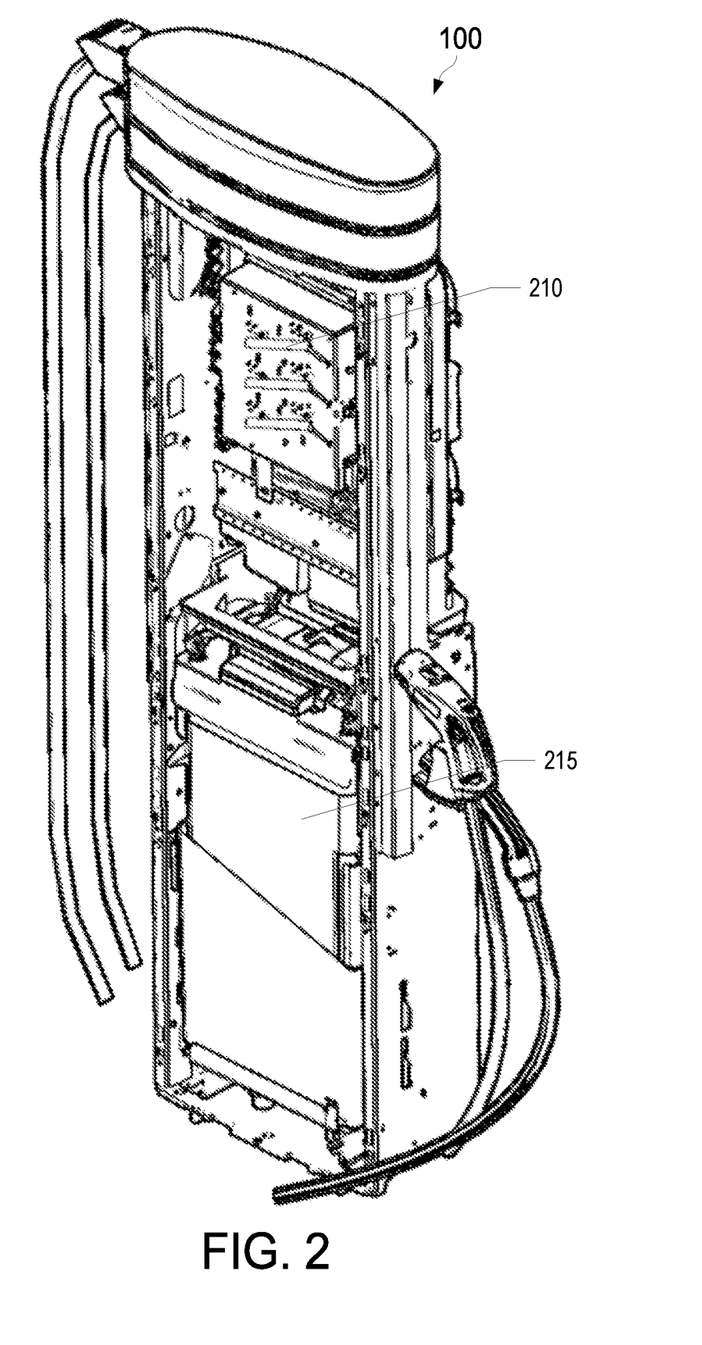
FIG. 2 shows some of the internal components of the DC EVSE of FIG. 1 according to an embodiment.

FIG. 2 shows some of the internal components of the DC EVSE 100 of FIG. 1 according to an embodiment. The EVSE 100 shown in FIG. 2 includes the secure enclosure 210. The secure enclosure 210 is shown in more detail in FIGS. 4 and 7. The EVSE 100 also includes one or more power modules 215. Each power module 215 converts Alternating Current (AC) to DC. Each power module 215 may supply power to an electric vehicle. Each power module 215 is electrically connected to the secure enclosure 210. The internal wiring that connects the power modules and the secure enclosure 210 is not shown so as to not obscure understanding of the embodiment. The secure enclosure 210 may be placed in a location within the DC EVSE 100 in which it is in line of a thermal management solution of the DC EVSE 100 such as in line with a fan.

Figure 3:
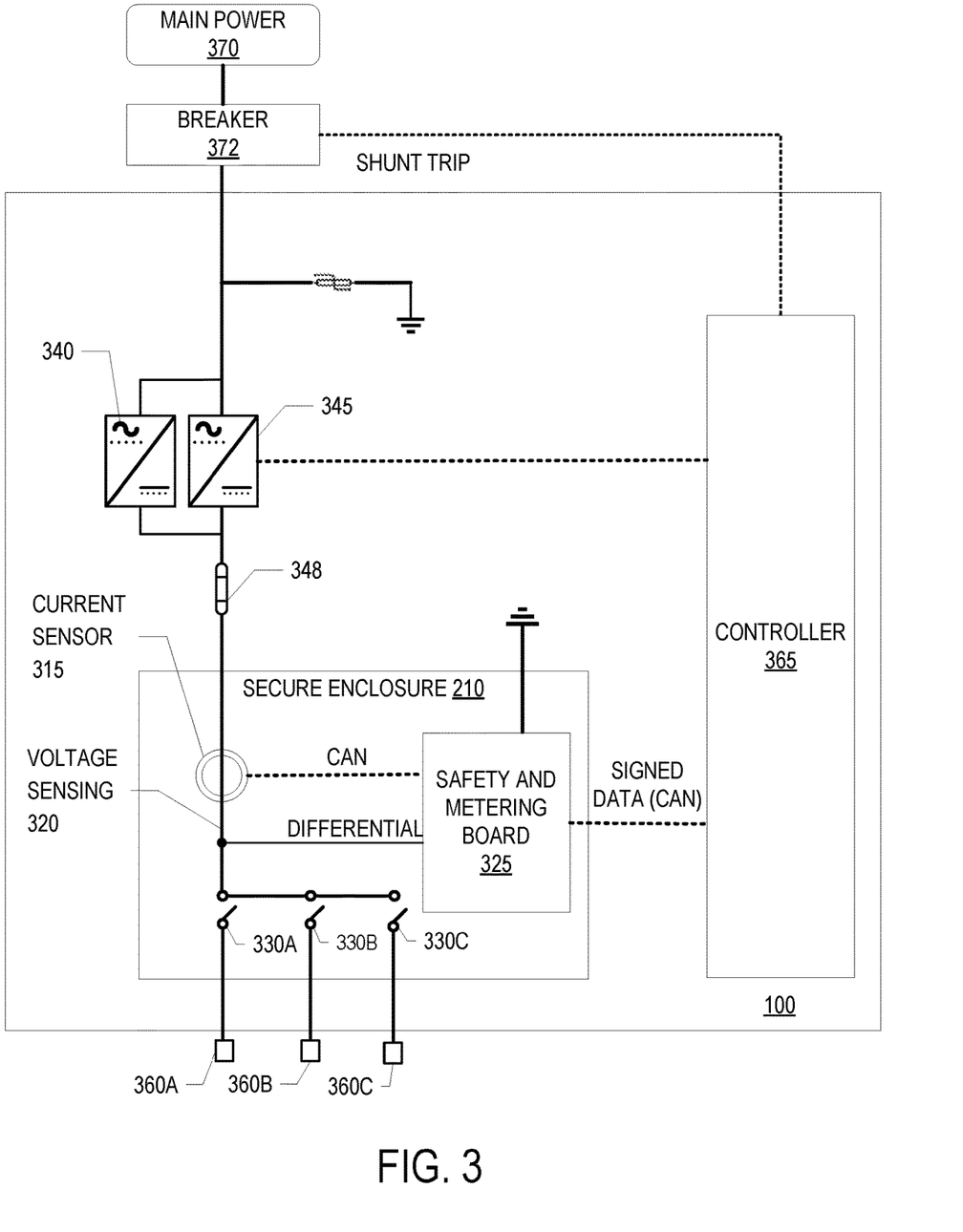
FIG. 3 illustrates an example of electrical packaging of the DC EVSE of FIG. 1 according to an embodiment.

FIG. 3 illustrates an example of electrical packaging of the DC EVSE 100 according to an embodiment. The DC EVSE 100 receives power from the main power 370 through the main breaker 372. The main power 370 may be AC mains supply, for example, 400 VAC/480 VAC, 3 phase. The DC EVSE 100 includes a set of one or more power converters to convert AC mains power 370 to DC power. As illustrated in FIG. 3, the EVSE 100 includes the power converter 340 and the power converter 345 to convert the AC mains power 370 to DC power. The power converters 340 and 345 may be provided by the power modules 215. The DC EVSE 100 includes a fuse 348 (e.g., a 250 Amp fuse) inline.

The secure enclosure 210 includes a set of one or more contactors to open and close to provide electrical connection for DC charge transfer with one or more electric vehicles. The one or more contactors electrically connect to DC input from the power converter(s) through one or more conductors (e.g., busbar, wire). As illustrated in FIG. 3, there are three sets of contactors 330A, 330B, and 330C that are coupled with the connectors 360A, 360B, and 360C respectively. Although three connectors and contactors are shown in FIG. 3, there may be one or more connectors and contactors respectively. For instance, FIG. 1 shows an embodiment with two connectors 120A and 120B. In such an embodiment, there may be two contactors for the two connectors 120A and 120B respectively. Each set of contactors may include a positive contactor and a negative contactor on the positive and negative side of the connection respectively. The contactors 330A-C are controlled by the controller 365 and the safety and metering board 325. For instance, the controller 365 may cause the contactors 330A, 330B, and/or 330B to open and close as appropriate. The term contactor as used herein includes relays and/or other types of suitable electrically operated switches.

The secure enclosure 210 further includes the current sensor 315. The current sensor 315 may be a hall effect current sensor, a shunt resistor, a magneto-resistive sensor, a magneto-optic sensor, or other way of measuring current. The current sensor 315 measures the amount of current that flows between an electric vehicle and the EVSE 100. The current sensor 315 is coupled with the safety and metering board 325 (e.g., through a CAN bus). The current sensor 315 provides digital current data or analog current data to the safety and metering board 325 that represents the measured amount of current.

The enclosure 210 further includes a voltage sensing circuitry 320 that senses the voltage and provides the sensed data to the safety and metering board 325. The voltage sensing circuitry 320 that may be a resistive voltage divider. The voltage sensing circuitry 320 may be provided on the safety and metering board 325 by two wires connecting to the safety and metering board 325.

The safety and metering board 325 receives the current data from the current sensor 315 and the voltage data from the voltage sensing circuitry 320. The safety and metering board 325 includes physical memory that stores information including metering information. The safety and metering board 325 includes one or more circuits for performing one or more safety functions and/or one or more metering functions. In an embodiment, all the safety and/or metering functions performed by the DC EVSE 100 are performed entirely by the single safety and metering board 325, and may be performed by a single processor of the safety and metering board 325 such as a secure boot capable processor.

The safety and metering board 325 may include one or more circuits that meter electric energy transferred (e.g., between an electric vehicle and the EVSE 100). For instance, the safety and metering board 325 may determine energy readings (e.g., the amount of electricity used over a given time period, such as in kilowatt hours). The metering information may be stored in the physical memory of the safety and metering board 325. The safety and metering board 325 signs data (e.g., the metering data, such as the current measurement, voltage measurement, power measurement, and/or energy reading) with a locally stored private key and transmits the signed data to one or more external components such as the controller 365. The external component(s), such as the controller 365, verifies the validity of the signed data using a corresponding public key. Validly signed data ensures that the data is reliable and has not been manipulated during transfer. The private key and optionally the public key may be stored within the physical memory of the safety and metering board 325 (e.g., a non-volatile memory). The private key (and the public key if stored within the physical memory of the safety and metering board 325) may not be changed without destroying the seal of the secure enclosure 210. As shown in FIG. 3, the safety and metering board 325 sends signed measurement data to the controller 365 (e.g., over a CAN bus). In an embodiment, in lieu of or in addition to signing the data, the safety and metering board 325 encrypts the data (e.g., the metering data, such as the current measurement, voltage measurement, power measurement, and/or energy reading) such that only the one or more external components (e.g., the controller 365) can decrypt the encrypted data. The safety and metering board 325 may, before sending the measurement values to the controller 365, initiate a handshake sequence with the controller 365.

As an example of a safety function performed by the EVSE 100, the safety and metering board 325 may include one or more circuits that detect and respond to overcurrent conditions based on the current data received from the current sensor 315. An overcurrent condition occurs when the amount of current exceeds an overcurrent threshold. The overcurrent threshold may include a time component such that an overcurrent condition is triggered only if the amount of current flowing exceeds or meets the threshold for a predefined amount of time. Different current amounts and time values can be used. For example, as the amount of current flowing increases, the amount of time the current must flow in order to exceed the overcurrent threshold decreases. For example, a first overcurrent threshold may define an overcurrent condition as X amps flowing for Y seconds and a second overcurrent threshold may define an overcurrent condition as L amps flowing for M seconds. Different overcurrent thresholds can be used in different embodiments. Upon detecting an overcurrent condition, the safety and metering board 325 prevents current from flowing. For instance, the safety and metering board 325 causes the contactors 330A and/or 330B to open upon detecting an overcurrent condition.

As another example of a safety function performed by the EVSE 100, the safety and metering board 325 may include one or more circuits that perform insulation monitoring and/or ground fault detection. For instance, the electrical isolation from earth is monitored and if there is a fault condition, the safety and metering board 325 prevents current from flowing (e.g., it causes the contactors 330A, 330B, and/or 330C to open).

As another example of a safety function performed by the EVSE 100, the safety and metering board 325 may include one or more circuits that perform over and/or under voltage protection based on the voltage value sensed by the voltage sensing circuitry 320. An over voltage condition occurs when the voltage exceeds a predefined limit. An undervoltage condition occurs when the voltage drops below a predefined limit. If an over voltage and/or under voltage condition occurs, the safety and metering board 325 may cause the contactors 330A, 330B, and/or 330C to open.

The safety and metering board 325 includes circuitry to communicate with the controller 365. For instance, the safety and metering board 325 may communicate with the controller 365 through a CAN bus and may sign and/or encrypt the information (as previously described).

The DC EVSE 100 includes the controller 365. The controller 365 is external to the secure enclosure 210. The controller 365 includes a processor and a memory (e.g., a non-transitory machine-readable storage medium) and provides for central control over the DC EVSE 100. For instance, the controller 365 manages the contactors 330A, 330B, and 330C including causing the contactors to open and close as appropriate.

The controller 365 may also include and execute an operating system for the DC EVSE 100. The operating system manages certain hardware and software for the dispenser including one or more of: a set of one or more network communication modules to communicate with a network (e.g., a Wide Area Network (WAN) module and/or a Local Area Network (LAN) module to communicate with a WAN and/or LAN network); a display module to manage a display of the DC EVSE 100; a Radio Frequency Identification (RFID) module for managing an RFID transceiver.

The controller 365 is capable of verifying the signed data received from the safety and metering board 325 and processing the verified data accordingly. In cases where encryption of the data is used, the controller 365 is capable of decrypting the encrypted data received from the safety and metering board 325 and processing the decrypted data accordingly.

The controller 365 may also manage the cooling of the DC EVSE 100. For instance, the DC EVSE 100 may include a liquid cable cooling system and the controller 365 may control the liquid cable cooling system including monitoring and controlling the liquid flow rate, pressure, inlet, outlet temperature, cable temperature, and/or connector temperature of the charging cable. The controller 365 may control one or more fans in the DC EVSE 100.

The controller 365 may include one or more communication module(s) that handle communications between the DC EVSE 100 and electric vehicles and/or between the DC EVSE 100 and a network entity such as a server.

The secure enclosure 210 may include tamper detection to detect unauthorized access. For instance, the tamper detection may detect if the secure enclosure 210 is opened. The tamper detection can take the form of a tilt sensor, light sensor, infrared sensor, acoustic sensor, a lead seal, or a sticker. In an embodiment, detection of a tamper attempt can trigger erasure of data on the safety and metering board 325 and/or the controller 365. The secure enclosure 210 may be factory sealed. The safety and metering board 325 may be calibrated and sealed in the factory.

Figure 4:
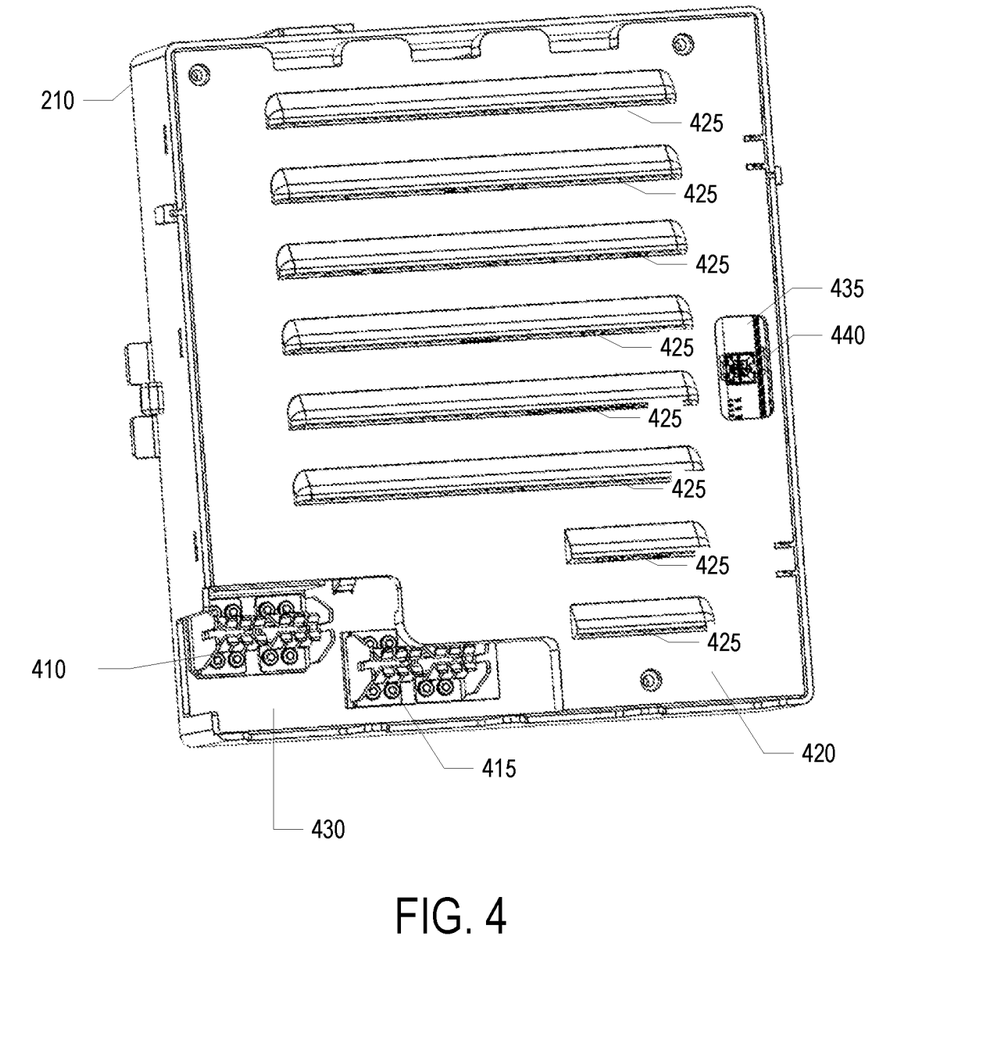
FIG. 4 shows an example of the secure enclosure according to an embodiment.

FIG. 4 shows an example of the secure enclosure 210 according to an embodiment. The secure enclosure 210 includes a housing that includes the cover 420. The cover 420 includes a series of openings 425 that allow air to enter the secure enclosure 210. The secure enclosure 210 includes one or more openings that allow one or more connections to components within the secure enclosure 210. For instance, the secure enclosure 210 includes a cutout portion 430 for connecting input power. As illustrated in FIG. 4, the cutout portion 430 exposes the busbar clips 410 and 415 that allow input power to be connected. By way of example, the busbar clip 410 may be for the positive side of the DC input and the busbar clip 415 may be for the negative side of the DC input. As another example, the secure enclosure 210 includes a cutout portion 435 that allows access to the ground connector 440.

Figure 5:
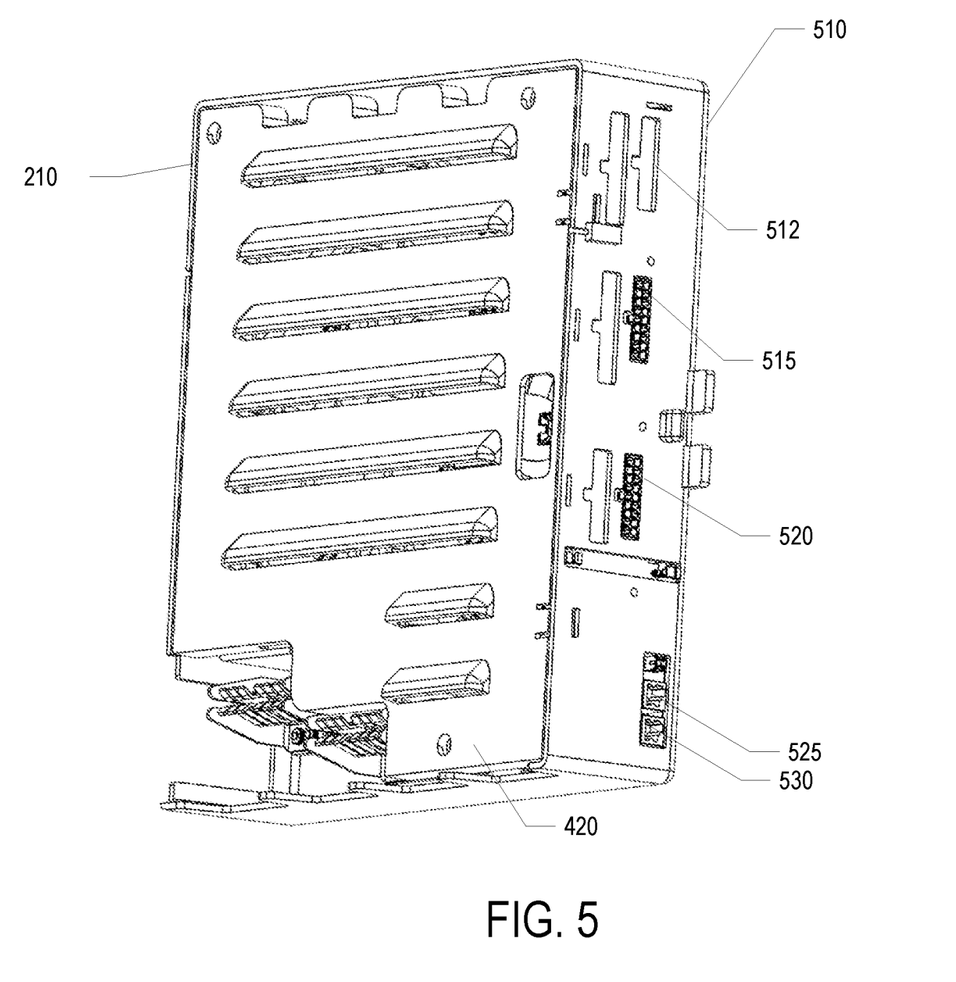
FIG. 5 shows a different view of the secure enclosure according to an embodiment.

FIG. 5 shows a different view of the secure enclosure 210. The view shown in FIG. 5 shows a side housing 510 of the secure enclosure 210 that includes openings for connections within the secure enclosure 210. For instance, the connector 512, the connector 515, and the connector 520 are EV cable connectors (e.g., for three different types of EV cables). The connectors 525 and 530 are CAN bus connectors (one "in" and one "out"). In an embodiment, the secure enclosure 210 and the controller 365 communicate through the CAN bus.

Figure 6:
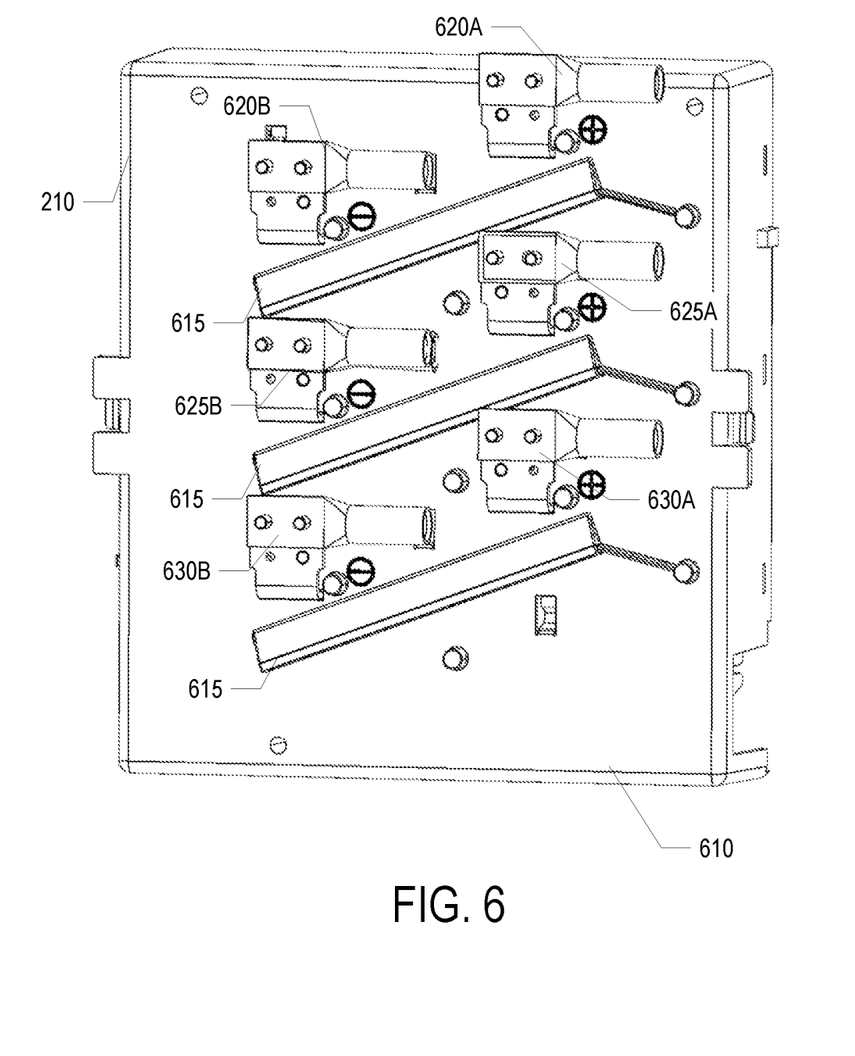
FIG. 6 shows a back view of the secure enclosure according to an embodiment.

FIG. 6 shows a back view of the secure enclosure 210. FIG. 6 shows three sets of contacts (each having a positive and negative) for three different charging connections. For instance, the contacts 620A and 620B are for a first charging connection, the contacts 625A and 625B are for a second charging connection, and the contacts 630A and 630B are for a third charging connection. As described previously, the number of charging connections is exemplary and there may be one or more charging connections. The back cover 610 includes the openings 615 that allow air to enter the secure enclosure 210.

Figure 7:
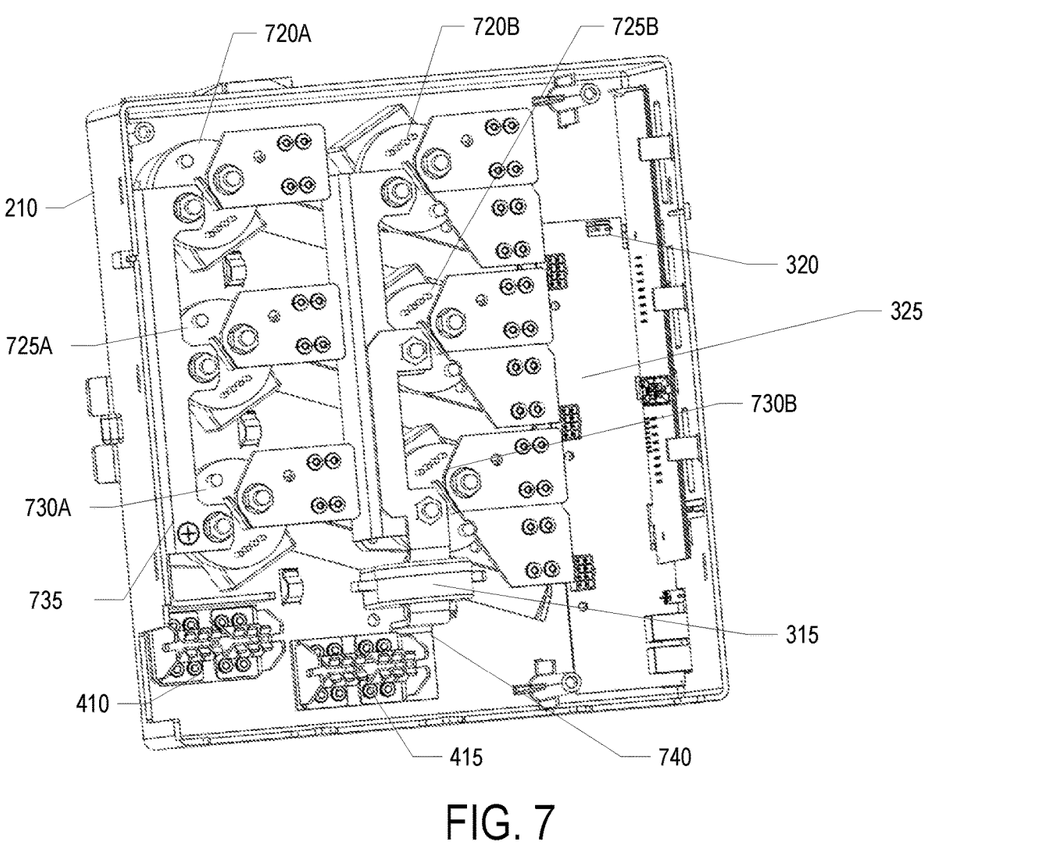
FIG. 7 shows the secure enclosure where the front cover has been removed according to an embodiment.

FIG. 7 shows the secure enclosure 210 where the front cover 420 has been removed. As shown in FIG. 7, the contactors 720A, 725A, and 730A are connected to the positive side of the input power through the busbar 735. The contactors 720A, 725A, and 730A correspond with the contacts 620A, 625A, and 630A respectively. The contactors 720B, 725B, and 730B are connected to the negative side of the input power through the busbar 740. The contactors 720B, 725B, and 730B correspond with the contacts 620B, 625B, and 630B respectively. The negative busbar 740 traverses through the current sensor 315. However, the current sensor 315 could be placed so that the positive busbar 735 traverses through the current sensor 315.

Although busbars are shown, other types of conductors (e.g., wires) may be used to electrically connect the contactors with the input power.

The secure enclosure 210 includes the safety and metering board 325. The voltage sensing circuitry 320 is provided on the safety and metering board 325. Not all of the components and connections of the safety and metering board 325 are shown in order to not obscure understanding. For instance, in an embodiment, the current sensor 315 connects to the safety and metering board 325 through a cable that is not shown. As another example, a processor (e.g., a secure boot capable processor) and memory of the safety and metering board 325 are not shown in FIG. 7.

Figure 8:
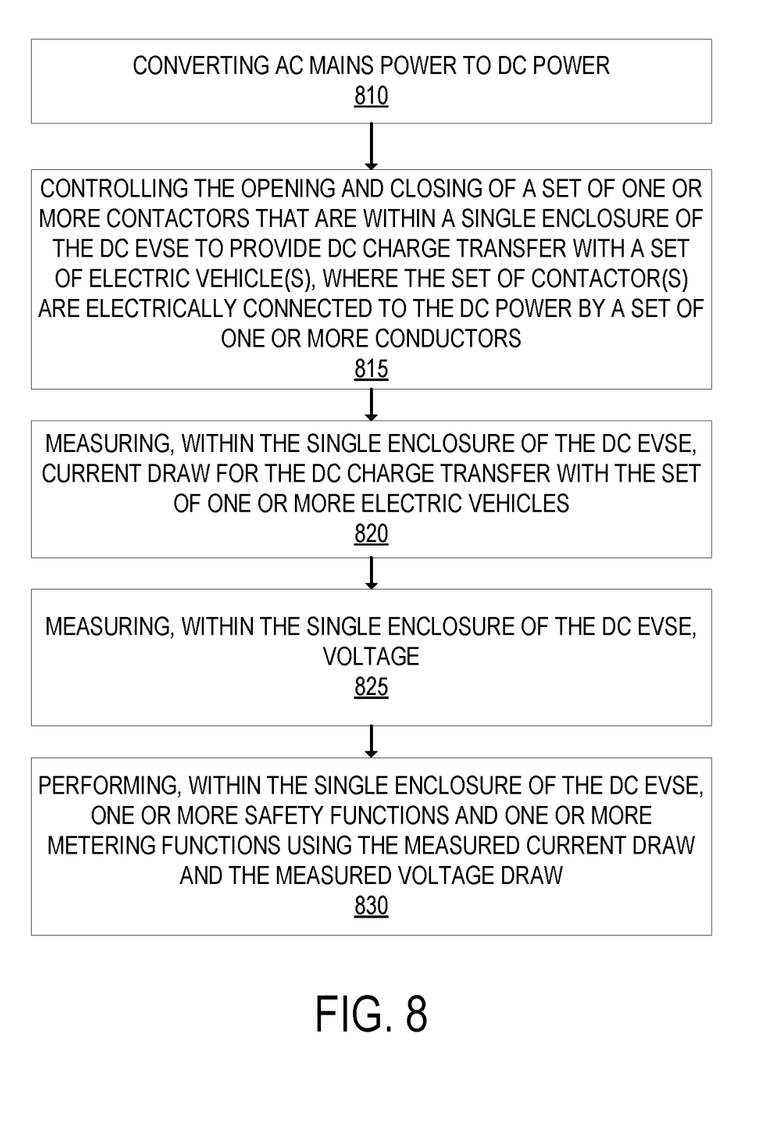
FIG. 8 is a flow diagram that illustrates exemplary operations performed by a DC EVSE such as the DC EVSE of FIG. 1 according to an embodiment.

FIG. 8 is a flow diagram that illustrates exemplary operations performed by a DC EVSE such as the DC EVSE 100 according to an embodiment. The operations described in association with FIG. 8 are described with respect to the exemplary embodiments of other Figures (e.g., FIGS. 3-7). However, the operations described in association with FIG. 8 can be performed by other embodiments, and the exemplary embodiments described herein can perform different operations than those described in association with FIG. 8.

At operation 810, the DC EVSE converts AC mains power to DC power. For instance, one or more power converters 340 and 345 convert the AC mains power 370 to DC power. Next, at operation 815, the DC EVSE controls the opening and closing of a set of one or more contactors (e.g., the contactors 330A-C) to provide DC charge transfer with a set of one or more electric vehicles. The set of contactor(s) are within a single enclosure of the DC EVSE, such as the secure enclosure 210. The set of contactor(s) are electrically connected to DC power by a set of one or more conductor such as a busbar or wire. For example, FIG. 7 shows an embodiment of the secure enclosure 210 where the contactors 720A-B, 725A-B, and 730A-B are electrically connected to DC power by the busbars 735 and 740 and the busbar clips 410 and 415. The control of opening or closing the set of contactors may be done by a controller that is external to the single enclosure (e.g., the controller 365 that is external to the secure enclosure 210). The opening/closing of the set of contactors may depend on communication with the electric vehicle and/or with an operator of the electric vehicle.

As previously described, the secure enclosure 210 includes current and voltage sensing circuitry to measure current draw and measure voltage. At operation 820, the DC EVSE measures, within the single enclosure (e.g., the secure enclosure 210), current draw for the DC charge transfer with the set of electric vehicle(s). A current sensor, such as the current sensor 315 within the secure enclosure 210, may measure the amount of current that flows between the electric vehicle and the DC EVSE 100. At operation 825, the DC EVSE measures, within the single enclosure (e.g., the secure enclosure 210), voltage. For example, the voltage sensing circuitry 320 may be provided by the safety and metering board 325 within the secure enclosure 210. The order of the operations 820 and 825 can be swapped. The single enclosure may store information including metering and/or measured data. For instance, the safety and metering board 325 may include physical memory that stores information such as the current measurement, voltage measurement, power measurement, and/or energy reading. The information can be signed (e.g., by the safety and metering board 325) and transmitted to an external component such as the controller 365. In addition to, or in lieu of signing the data, the data can also be encrypted before transmitting to the external component.

At operation 830, one or more safety functions and/or one or more metering functions are performed, within the single enclosure of the DC EVSE (e.g., the secure enclosure 210) using the measured data (e.g., the measured current draw and/or the measured voltage). The one or more safety functions and/or one or more metering functions can be performed by the safety and metering board 325 (e.g., by a secure boot capable processor of the safety and metering board 325) included within the secure enclosure 210, for example. The one or more safety functions may include one or more of: overcurrent condition, insulation monitoring, ground fault detection, over voltage protection, and under voltage protection. The metering functions may include determining an energy reading (e.g., the amount electricity used over a given time period, such as in kilowatt hours).

In the preceding description, numerous specific details such as are set forth in order to provide a more thorough understanding. It will be appreciated, however, by one skilled in the art that embodiments may be practiced without such specific details. In other instances, control structures, gate level circuits, and/or full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While several embodiments have been described, those skilled in the art will recognize that the invention is not limited to the embodiments described and can be practiced with modification and alteration within the spirit and scope of the appended claims. The description is thus to be regarded as illustrative instead of limiting.

What is claimed is:

1. A secure enclosure to be included in a direct current (DC) electric vehicle supply equipment (EVSE), the secure enclosure comprising:
   a set of one or more contactors to open and close to provide DC charge transfer with a set of one or more electric vehicles;
   a conductor to electrically connect the set of one or more contactors to DC input from a set of one or more power converters to convert alternating current (AC) mains power to direct current (DC) power, wherein the set of one or more power converters are external to the secure enclosure;
   a current sensor to measure current draw;
   a voltage sensing circuitry to measure voltage; and
   one or more circuits that receive current data from the current sensor and voltage data from the voltage sensing circuitry, the one or more circuits to perform one or more safety functions and one or more metering functions using the received current data and voltage data, and to transmit metering data to a controller of the DC EVSE that is external to the secure enclosure.

2. The secure enclosure of claim 1, wherein the one or more circuits are part of a secure boot capable processor, and wherein the secure boot capable processor is to sign the metering data and to transmit the metering data includes to transmit the signed metering data to the controller.

3. The secure enclosure of any of claim 1, wherein the secure enclosure is secured with tamper detection.

4. The secure enclosure of claim 1, wherein the secure enclosure is factory sealed.

5. The secure enclosure of claim 1, wherein the one or more safety functions include one or more of:
   overcurrent protection;
   insulation monitoring;
   ground fault detection;
   over voltage protection; and
   under voltage protection.

6. The secure enclosure of claim 1, wherein the current sensor is a hall effect sensor.

7. A direct current (DC) electric vehicle supply equipment (EVSE), comprising:
   a set of one or more power converters to convert alternating current (AC) mains power to DC power, wherein the set of one or more power converters are external to a single enclosure;
   the single enclosure including:
      a set of one or more contactors to open and close to provide DC charge transfer with a set of one or more electric vehicles,
      a conductor to electrically connect the set of one or more contactors to DC input from the set of one or more power converters to convert AC mains power to DC power,
      a current sensor to measure current draw,
      a voltage sensing circuitry to measure voltage, and
      one or more circuits that receive current data from the current sensor and voltage data from the voltage sensing circuitry, the one or more circuits to perform one or more safety functions and one or more metering functions using the received current data and voltage data; and
   a controller that is external to the single enclosure and coupled with the one or more circuits, the controller to control opening and closing of the set of one or more contactors.

8. The DC EVSE of claim 7, wherein the one or more circuits are part of a secure boot capable processor, and wherein the secure boot capable processor is to sign metering data and transmit the signed metering data to the controller.

9. The DC EVSE of claim 8, wherein the controller is further to verify the signed metering data and process the metering data.

10. The DC EVSE of claim 7, wherein the single enclosure is secured with tamper detection.

11. The DC EVSE of claim 7, wherein the single enclosure is factory sealed.

12. The DC EVSE of claim 7, wherein the one or more safety functions include one or more of:
   overcurrent protection;
   insulation monitoring;
   ground fault detection;
   over voltage protection; and
   under voltage protection.

13. The DC EVSE of claim 7, wherein the current sensor is a hall effect sensor.

14. The DC EVSE of claim 7, wherein the controller further includes one or more communication modules to communicate with one or more electric vehicles.

15. A method performed in a direct current (DC) electric vehicle supply equipment (EVSE), comprising:
   converting alternating current (AC) mains power to DC power, wherein the converting AC mains power to DC power is performed externally to a single enclosure of the DC EVSE;
   controlling opening and closing of a set of one or more contactors that are within the single enclosure of the DC EVSE to provide DC charge transfer with a set of one or more electric vehicles, wherein the set of one or more contactors are electrically connected to the DC power by a set of one or more conductors, wherein the controlling opening and closing of the set of one or more contactors is performed externally to the single enclosure of the DC EVSE;
   measuring, within the single enclosure of the DC EVSE, current draw for the DC charge transfer with the set of one or more electric vehicles;
   measuring, within the single enclosure of the DC EVSE, voltage; and
   performing, within the single enclosure of the DC EVSE, one or more safety functions and one or more metering functions using the measured current draw and the measured voltage.

16. The method of claim 15, wherein the one or more safety functions and one or more metering functions are performed by a secure boot capable processor included within the single enclosure.

17. The method of claim 15, further comprising:
   signing metering data; and
   transmitting the signed metering data to a controller of the DC EVSE, wherein the controller is external to the single enclosure.

18. The method of claim 15, wherein the single enclosure is secured with tamper detection.

19. The method of claim 15, wherein the single enclosure is factory sealed.

20. The method of claim 15, wherein the one or more safety functions include one or more of:
   overcurrent protection;
   insulation monitoring;
   ground fault detection;
   over voltage protection; and
   under voltage protection.

\* \* \* \* \*